(12) United States Patent
Hein et al.

(10) Patent No.: US 7,221,359 B2
(45) Date of Patent: May 22, 2007

(54) ILLUMINATED TOUCH SWITCH

(75) Inventors: David A. Hein, Sterling Heights, MI (US); Todd L. DePue, Brighton, MI (US); Michael W. Cass, Lenox, MI (US)

(73) Assignee: Lear Corporation, Southfield, MI (US)

( * ) Notice: Subject to any disclaimer, the term of this patent is extended or adjusted under 35 U.S.C. 154(b) by 603 days.

(21) Appl. No.: 10/802,308

(22) Filed: Mar. 17, 2004

(65) Prior Publication Data

US 2005/0206623 A1    Sep. 22, 2005

(51) Int. Cl.
   *G09G 3/30*   (2006.01)
   *G09G 5/00*   (2006.01)

(52) U.S. Cl. .......................................... 345/173; 345/76

(58) Field of Classification Search .................. 345/36, 345/45, 76, 173, 176; 341/22, 23
See application file for complete search history.

(56) References Cited

U.S. PATENT DOCUMENTS

| | | | |
|---|---|---|---|
| 4,449,023 A | | 5/1984 | Hilhorst et al. |
| 4,532,395 A | * | 7/1985 | Zukowski ................... 200/314 |
| 5,040,479 A | | 8/1991 | Thrash |
| 5,760,715 A | | 6/1998 | Senk et al. |
| 6,462,469 B1 | * | 10/2002 | Young ........................ 313/504 |
| 6,529,122 B1 | | 3/2003 | Magnussen et al. |
| 2002/0125118 A1 | | 9/2002 | Douzono et al. |
| 2002/0145591 A1 | * | 10/2002 | Hato et al. ................... 345/156 |
| 2002/0170809 A1 | | 11/2002 | Snider |
| 2003/0043120 A1 | | 3/2003 | Han |
| 2003/0122794 A1 | | 7/2003 | Caldwell |
| 2003/0159910 A1 | | 8/2003 | Caldwell |

FOREIGN PATENT DOCUMENTS

WO    WO 03/044956    5/2003

* cited by examiner

*Primary Examiner*—Sumati Lefkowitz
*Assistant Examiner*—Rodney Amadiz
(74) *Attorney, Agent, or Firm*—MacMillan, Sobanski & Todd, LLC

(57) ABSTRACT

A touch sensitive electroluminiescent (EL) switch is provided in a vehicle for actuating a vehicle accessory. A dielectric layer is adjacent to a rear electrode layer. A phosphor layer is adjacent to the dielectric layer. A transparent electrode layer includes a pad adjacent to the phosphor layer, and a substantially concentric conductive trace is adjacent to the phosphor layer and is spaced from the pad in the transparent electrode layer. The phosphor layer is disposed between the rear electrode layer and the pad and defines an illuminated region when energized by a first voltage. The substantially conductive trace and the pad cooperate to define a detection region substantially coinciding with the illuminated region when energized by a second voltage.

17 Claims, 2 Drawing Sheets

ILLUMINATED TOUCH SWITCH

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

1. Field of the Invention

The present invention relates in general to an illuminated touch sensitive switch, and more specifically, to an electroluminiescent touch switch.

2. Description of the Related Art

Vehicle accessory input controls typically consist of devices which require rotating a control knob, depressing a control button, or sliding a mechanical or electro-mechanical control switch to operate or adjust a vehicle accessory device such as a radio, CD player, or climate control. An exterior casing or oversize buttons and knobs are typically used to dress up and conceal the gaps between the bezel and the movable components of the input control devices. Despite the addition of these facial coverings to make the appearance presentable and visually appealing, the plurality of interlocking components leaves way for dirt and debris to lodge in the gaps and crevices between these interlocking components. Devices such as appliances have been known to use switches under the surface of a fascia of the appliance to create a sealed environment, however, these devices have been limited to a physical press and release operation.

Capacitive sensors are sometimes used as a switch actuator. A capacitive sensor disposed under a surface fascia creates a capacitance above the fascia surface which varies in the presence of conductive objects placed nearby. A change of capacitance is sensed in order to initiate a request by an operator to actuate a switch.

In order to use capacitive switches in dark environments (e.g. a car at night), dedicated lighting with a device may be necessary. LEDs may be used in conjunction with a capacitive switch (e.g., backlighting). However, either a large number of LEDs must be used, or the LEDs must be positioned to illuminate more than one button or incorporate light piping to tunnel the light to a plurality of switches. An individual LED used to illuminate more than one switch often produces uneven distribution of lighting on each switch.

Electroluminescence (EL) lighting uses a phosphor layer within an EL film that is excited by a high voltage source to produce an even distribution of lighting. An EL film has been formed on the top surface of a capacitive switch for illuminating the switch. However, prior systems have used the same high voltage A/C signal to excite the phosphor layer and to generate the electric field used to detect switch actuation. Using a high voltage A/C source to generate the electric field may result in a driver or passenger receiving a high voltage shock. Furthermore, prior capacitive switches integrated with EL lighting have required an excessive number layers. Additional layering adds thickness and cost to the switch.

SUMMARY OF THE INVENTION

The present invention provides a touch sensitive electroluminiescent switch which is illuminated by generating a high voltage electric field between a conductive pad and rear electrode layer for energizing a phosphor layer therein. In addition, a substantially conductive trace formed in a same transparent electrode layer as the conductive pad cooperates with the conductive pad to form a detection region when energized by a low voltage electric field.

A touch sensitive electroluminiescent (EL) switch is provided in a vehicle for actuating a vehicle accessory. A dielectric layer is adjacent to a rear electrode layer. A phosphor layer is adjacent to the dielectric layer. A transparent electrode layer includes a pad adjacent to the phosphor layer, and a substantially concentric conductive trace is adjacent to the phosphor layer and is spaced from the pad in the transparent electrode layer. The phosphor layer is disposed between the rear electrode layer and the pad and defines an illuminated region when energized by a first voltage. The substantially conductive trace and the pad cooperate to define a detection region substantially coinciding with the illuminated region when energized by a second voltage.

DETAILED DESCRIPTION OF PREFERRED EMBODIMENTS

Figure 1:
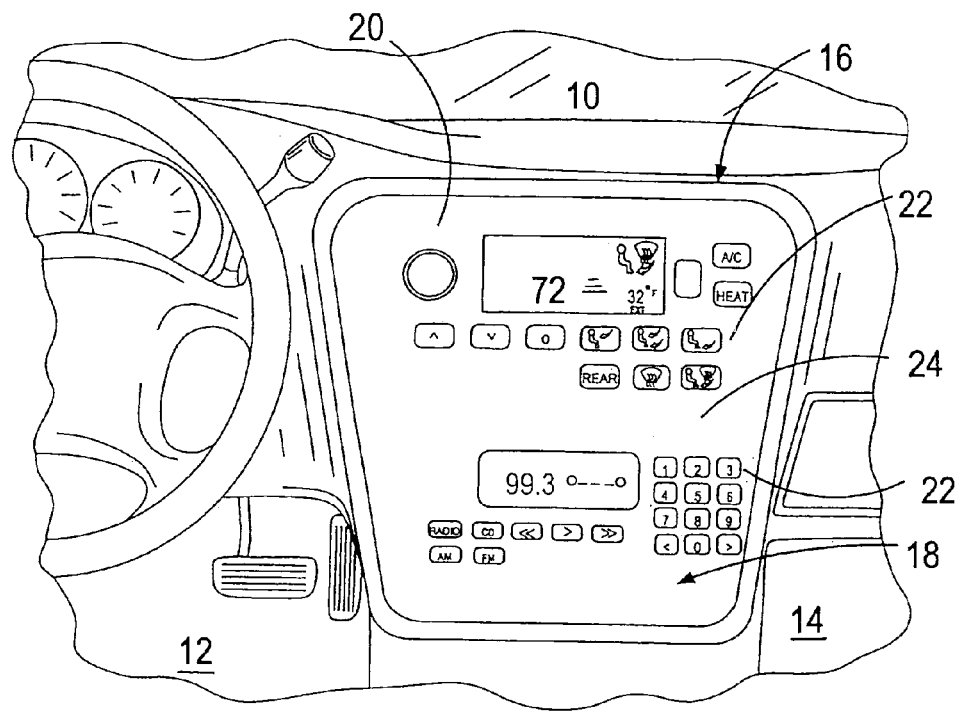
FIG. 1 is a perspective view of an instrument control panel for controlling vehicle accessories.

Referring now to the Drawings and particularly to FIG. 1, there is shown an interior passenger compartment 10 of a vehicle according to the present invention. The interior passenger compartment 10 comprises a front drivers seating area 12, a front passenger seating area 14, and a center accessory control unit 16. The center accessory control unit 16 includes a multimedia control unit 18 and a climate control unit 20. Both control units include a plurality of switches (e.g., buttons) 22 for controlling a specific feature of each respective accessory. For example, the multimedia control unit 18 typically includes switches for controlling multimedia selections such as CD, radio, AM/FM, fast forward, reverse, and preset memory. The climate control unit 20 typically include switches for controlling temperature increase/decrease, defrost, A/C, blower motor, and blower motor output porting.

The plurality of switches 22 is disposed under a surface of a bezel 24 and is directed toward the interior of the vehicle for sensing an object (e.g., finger) in close proximity to a respective switch. Each touch sensitive switch utilizes at least two capacitance plates (i.e., electrodes) for capacitance sensing. The at least two electrodes generate electric fields in a detection region above the surface of the bezel 24 when energized by a low voltage AC signal (0–5 VAC). The electrodes are monitored for a change of capacitance in the detection region of each switch. An object (e.g., a finger) selectively displaced within the detection region changes the electric fields. The sensed change in the electric fields are associated with a request to actuate a corresponding accessory function. Since the plurality of switches 22 is mounted within the bezel 24 (or other interior trim panel) and is capable of providing a sensing area exterior to the skin of the bezel 24, gaps and cut lines typically associated with mechanical switches, levels, buttons, dials, and control knobs are eliminated. This provides for an aesthetically pleasing appearance of an instrument or trim panel wherein the plurality of switches 22 is substantially inconspicuous.

The plurality of switches 22 may further comprise graphics or other indicators printed on an exterior surface of each respective switch to identify the location of each respective switch and its associated function. In addition, during poor lighting conditions, lighting schemes may be added to illuminate the respective switch or graphic display. In the preferred embodiment, electroluminiescent (EL) lighting is used to illuminate an illumination region of the respective switch. An EL film 24 (shown in FIG. 2) provides the illumination. When a high voltage source of alternating current (100–300 VAC) is applied to the EL film 24, the illumination region is thereby illuminated.

Figure 2:
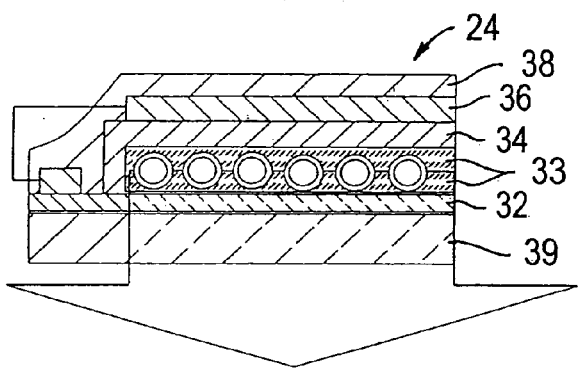
FIG. 2 is a cross-sectional view of a typical EL film.

FIG. 2 illustrates a composition of an EL film 24 for the preferred embodiment. The EL film 24 comprises a transparent electrode layer 32 formed adjacent to a layer of phosphor ink 33. The transparent electrode layer 32 may comprise ITO (indium tin oxide) material. A protective coating layer 39 such as PET (polyethylene terephthalate) material is formed adjacent to the transparent electrode layer 32. The phosphor layer 33, which is the illumination source of the EL film 24, is formed adjacent to a dielectric layer 34. The dielectric layer 34 is formed adjacent to a rear conductor layer 36 (i.e., rear electrode). A rear insulation layer 38 (e.g., varnish) may be formed adjacent to an opposite (exposed) side of rear electrode layer 36 for insulation purposes, if desired. A partially-opaque patterned layer (e.g., silk screen) may be formed between the transparent electrode layer 32 and the protective coating layer 39 to provide a graphic design to enhance the visibility and identify the function of the of a respective switch. The EL film formed of the preferred embodiment is only one embodiment for forming the EL film. Other methods known for forming the EL layers may be used as well as the materials selected for each of the layers.

The phosphor layer 33 may comprise distinct areas of different phosphor inks to enhance design of the graphics. In addition to using different colored phosphor inks to provide different illumination colors, some spectrums of color may be changed (e.g., green to blue) by varying the frequency of the power supplied to the EL film 24. If graphics are used, the patterned layer is formed on the transparent electrode layer 32 to directly or indirectly illuminate the graphic design. For example, if an AM/FM graphic (shown in FIG. 1) is the actual element illuminated, then an area outlining the AM/FM graphic will be opaquely coated on the transparent conductive layer 32 such that only the actual AM/FM graphic is illuminated. Utilizing more than one phosphor ink allows the graphic design to be displayed in one or more colors. Alternatively, if the siren graphic is displayed by illuminating only the background, then the AM/FM graphic is opaquely coated and only the outlining area is illuminated. Furthermore, the background area and the graphic design may be illuminated simultaneously using different color phosphor inks.

Figure 3:
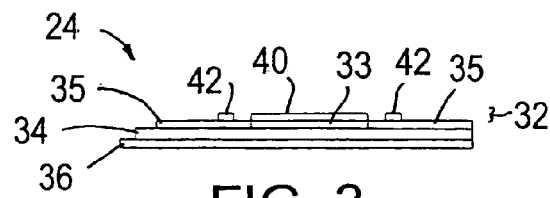
FIG. 3 is a cross-sectional view of an EL film having illumination and touch switch capability according to the preferred embodiment of the present invention.

In FIG. 3, the EL film 24 is shown integrating illumination and touch switch capabilities. The rear electrode 36 forms the base of the EL film 24. The rear electrode 36 is electrically connected to a high voltage signal generator. The dielectric layer 34 and the phosphor layer 33 are successively overlayed on the rear electrode layer 36, respectively. A transparent electrode layer 32 is disposed on the phosphor layer 33. In the preferred embodiment, the phosphor layer 33 is disposed only under a portion of the transparent electrode layer 32, which allows only a designated area to be illuminated. A filler 35 or dielectric material is juxtaposed beyond the outer perimeter of phosphor layer 33. Alternatively, the phosphor layer 33 may be used in place of the filler 33 and an opaquely coated ink may be overlayed on the surface area where illumination is not required. The transparent electrode layer 32 comprises a central conductive pad 40 and a substantially conductive trace 42. The central conductive pad 40 forms a circular pad. The central conductive pad 40 is also connected to a high voltage signal generator. The electric field generated by the central conductive pad and the rear electrode layer energizes the phosphor layer 33 thereby illuminating the illumination region. The substantially conductive trace 42 is an open loop arranged concentrically with the central conductive pad 40 and is spaced from the periphery of the central conductive pad 40 by a gap 44. The substantially conductive trace 42 and the central conductive pad 40 are non-contacting. The substantially conductive trace 42 and central conductive pad 42 are electrically connected to a low voltage A/C generator for generating a low voltage field within a detection region. When actuating a respective switch, a person selectively displaces their finger within the detection region. A change of capacitance occurs in response to the finger selectively displaced within the detection region. The change of capacitance within the detection region is identified as a request to actuate the respective switch.

Figure 4:
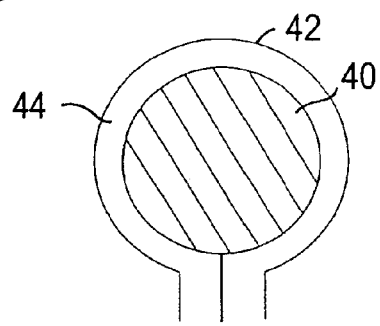
FIG. 4 top sectional view of the EL film illustrating the EL illumination region and detection region.

FIG. 4 illustrates a top section view of an EL illumination region and the substantially conductive trace formed in a single transparent electrode layer. In the preferred embodiment, the central conductive pad 40 forms a circle of a predetermined diameter. In other embodiments, any peripheral shape may be utilized. The substantially conductive trace 42 is spaced from the central conductive pad 40 having a similar peripheral shape as the central conductive pad 40. Both the central conductive pad 40 and the substantially conductive trace 42 are disposed within the same layer (i.e., transparent conductive layer 32). Two electric fields are generated when the low voltage A/C signal is applied to the central conductive pad 40 and the substantially conductive trace 42 thereby forming the detection region coinciding with the illumination region. A first electric field is generated between the central conductive pad 40 and the surface of a bezel thereby forming a portion of the detection region coinciding with the illumination region. A second electric field is generated between substantially conductive trace 42 and the surface of the bezel thereby forming another portion of the detection region coinciding with the illumination region. In response to a separate lighting command, the phosphor layer 33 is energized by the high voltage A/C field generated by the central conductive pad 40 and the substantially conductive trace 42 for illuminating an illumination region corresponding to the pad 40.

Figure 5:
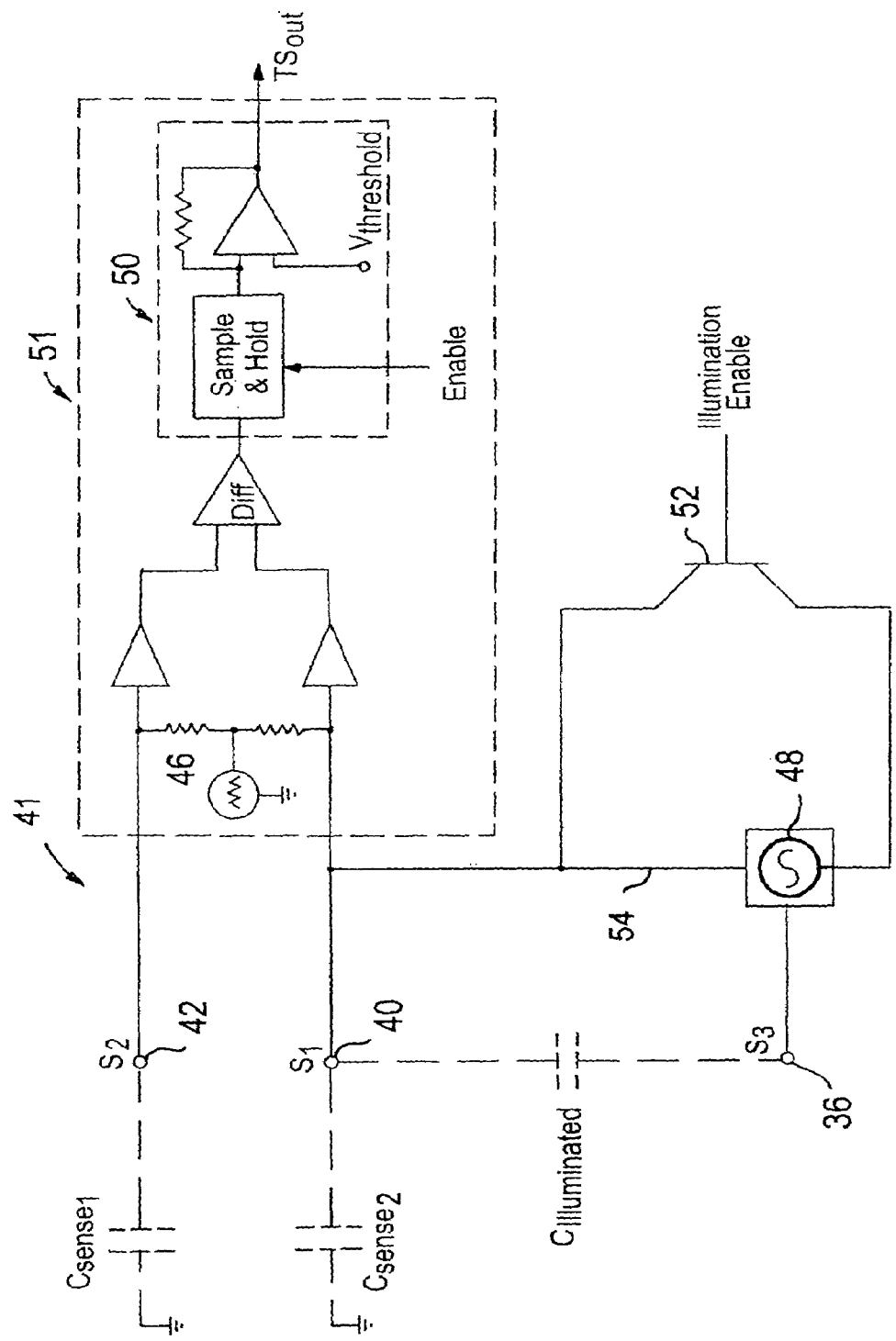
FIG. 5 is a schematic of a differential capacitive circuit for illumination and touch sensing according to the preferred embodiment of the present invention.

FIG. 5 illustrates a schematic representation of a differential capacitive circuit 41 for illumination and touch sensing. The substantially conductive trace 42 ($S_2$) and the central conductive pad 40 ($S_1$) are electrically connected to a low signal A/C signal generator 46. The low signal A/C generator 46 applies a low voltage to $S_1$ and $S_2$. The low voltage applied to $S_1$ generates a first predetermined electric field ($C_1$) between $S_1$ and a surface of the bezel. The low voltage applied to $S_2$ generates a second predetermined electric field ($C_2$) between $S_1$ and the surface of the bezel. The electric field generated at $S_2$ functions as a reference signal. When an object such as a finger is selectively displaced within the detection region, a first capacitance of a large body of mass of the person placing their finger within the detection region is connected in series with $C_1$ thereby generating a change in capacitance ($C_{sense1}$). However, depending upon other closely positioned touch sensitive switches, a determination must be made whether this respective switch is intended for actuation or possibly a next switch in close proximity is intended for actuation. As a result, the electric field generated at $S_2$ provides a reference signal for making such a determination. A second capacitance of a body of mass of the person placing their finger within the detection region is connected in series $C_2$ thereby generating a change in capacitance ($C_{sense2}$). If the differential change of capacitance between $C_{sense1}$ and $C_{sense2}$ is small (i.e., within a first predetermined threshold of each other), then a determination is made that the respective switch generating $C_{sense1}$ and $C_{sense2}$ is intended for actuation. If the differential change of capacitance between $C_{sense1}$ and $C_{sense2}$ is not within the predetermined threshold, then a determination is made that the respective switch generating $C_{sense1}$ and $C_{sense2}$ is not intended for actuation. A sensing circuit 51 is connected to $S_1$ and $S_2$ for sensing the change of capacitance of each circuit. An application-specific integrated circuit (ASIC) 50 receives the sensed capacitance of $S_1$ and $S_2$ and outputs a touch switch signal ($TS_{out}$). Functionality of the ASIC chip is further described in co-pending application 74461. $TS_{out}$ is input to a controller (not shown). If $TS_{out}$ indicates a both $C_{sense1}$ and $C_{sense2}$ are within a predetermined threshold, then the respective vehicle accessory is actuated.

The differential capacitive circuit 41 further includes a high voltage A/C signal generator 48. The central conductive pad 40 ($S_1$) is electrically connected to the high voltage A/C signal ground via a transistor 52. The rear electrode layer 36 ($S_3$) is electrically connected to the positive terminal of the high voltage A/C signal. The high voltage signal applied to $S_1$ and $S_3$ generates a second electric field ($C_{illuminate}$). $C_{illuminate}$ energizes the phosphor layer 33 (shown in FIG. 3) which illuminates the respective illumination region. To avoid a possible shock to a person actuating the respective switch, the high voltage A/C signal is provided to $S_3$ only when $S_1$ is connected to the high voltage A/C ground source. Otherwise, the high potential generated on $S_3$ may electrically shock the person depressing the respective switch without $S_1$ being properly grounded. To ground $S_1$, an illumination enable signal is provided from the controller to a base of the transistor 52 for electrically connecting $S_1$ to the high voltage A/C ground source. A ground enable sense line 54 is electrically connects $S_1$ to an enable terminal of the high voltage A/C signal generator 48. When the enable terminal senses ground on sense line 54, the high voltage A/C signal is applied to $S_3$ for illuminating the illumination region of the switch. Allowing no voltage to be generated by the high voltage A/C signal generator 48 until $S_1$ is properly grounded prevents the person actuating the respective switch from receiving an electrical shock from the high voltage A/C signal.

From the foregoing description, one ordinarily skilled in the art can easily ascertain the essential characteristics of this invention and, without departing from the spirit and scope thereof, can make various changes and modifications to the invention to adapt it to various usages and conditions. For example, the illumination region may be re-located by depositing a layer of phosphor on only those areas requiring illumination. For example, the phosphor layer may only occupy a ring around the outer perimeter of the central conductive pad as opposed to the entire central pad. Furthermore, the illumination of the phosphor layer does not require that the phosphor layer be positioned directly between and within the perimeter of each electrode for illumination, rather illumination may occur if the phosphor layer is offset from the direct electric field but still within a residual effects of the electric field. This may occur if the phosphor layer is directly inline with one electrode but not the other electrode (e.g., offset electrodes). However, if the residual electric field is of a low potential, the illumination of the offset phosphor layer will be low as well.

What is claimed is:

1. A touch sensitive electroluminiescent (EL) switch comprising:
    a rear electrode layer;
    a dielectric layer adjacent to said rear electrode layer;
    a phosphor layer adjacent to said dielectric layer; and
    a transparent electrode layer including a pad adjacent to said phosphor layer, and a substantially concentric conductive trace adjacent to said phosphor layer spaced from said pad in said transparent electrode layer;
    wherein said phosphor layer disposed between said rear electrode layer and said pad define an illuminated region when energized by a first voltage, wherein said substantially conductive trace and said pad cooperate to define a detection region substantially coinciding with said illuminated region when energized by a second voltage.

2. The EL touch switch of claim 1 wherein said first and second voltages are in phase alternating current signals.

3. The EL touch switch of claim 2 wherein said first voltage is 100–300 volts.

4. The EL touch switch of claim 2 wherein said second voltage is 0–5 volts.

5. The EL touch switch of claim 1 wherein said substantially conductive trace and said pad generate electrical fields coinciding within said detection region.

6. The EL touch switch of claim 5 wherein potential variations occur in response to an object selectably disposed within said detection region.

7. The EL touch switch of claim 6 wherein a differential capacitive circuit differentiates said potential variations of said electric fields of said pad and said substantially conductive trace.

8. The EL touch switch of claim 1 wherein said illumination region further comprises a graphic.

9. A control panel including at least one touch sensitive electroluminiescent (EL) switch formed in a vehicle for actuating a vehicle accessory, the control panel comprising:
    a plastic substrate forming a portion of an interior trim panel of said vehicle, said plastic substrate including a first side surface exposed to an interior passenger compartment of said vehicle;
    a rear electrode layer formed in said plastic substrate;
    a dielectric layer adjacent to said rear electrode layer;
    a phosphor layer adjacent to said dielectric layer; and
    a transparent electrode layer including a pad adjacent to said phosphor layer, and a substantially concentric conductive trace adjacent to said phosphor layer spaced from said pad in said transparent electrode layer;

wherein said phosphor layer disposed between said rear electrode layer and said pad define an illuminated region when energized by a first voltage, wherein said substantially conductive trace and said pad cooperate to define a detection region substantially coinciding with said illuminated region when energized by a second voltage, and wherein said vehicle accessory is actuated in response to a potential variation in said detection region.

10. A method for illuminating a touch sensitive electroluminescent (EL) switch within a vehicle, the method comprising the steps of:
   providing a rear electrode layer;
   providing a dielectric layer adjacent to said rear electrode layer;
   providing a phosphor layer adjacent to said dielectric layer;
   providing a transparent electrode layer including a pad adjacent to said phosphor layer, and a substantially concentric conductive trace adjacent to said phosphor layer spaced from said pad in said transparent electrode layer;
   energizing an illumination region defined by said phosphor layer disposed between said rear electrode layer and said pad, said illumination region energized by a first voltage; and
   energizing a detection region formed about said substantially conductive trace and said pad, said detection region energized by a second voltage.

11. The method of claim 10 further comprising the step of detecting a potential variation of said detection region.

12. The method of claim 11 further comprising the step of providing an enabling signal for illuminating said illumination region in response to said potential variation of said detection region.

13. The method of claim 12 further comprising the step of electrically connecting said rear electrode to a ground circuit of a high voltage signal generator in response to said enabling signal.

14. The method of claim 12 further comprising the step of providing said first voltage to said pad and said rear electrode layer in response to said enabling signal.

15. The method of claim 10 wherein said EL touch switch is formed in a control panel within said vehicle.

16. The method of claim 10 wherein said EL touch switch is formed in a bezel within said vehicle.

17. The method of claim 10 wherein said EL touch switch is formed in an interior trim panel within said vehicle.

* * * * *